United States Patent
Revuri et al.

(10) Patent No.: US 12,093,740 B2
(45) Date of Patent: Sep. 17, 2024

(54) METHOD AND SYSTEM FOR BUSINESS YIELD AWARE WORKLOAD DISTRIBUTION

(71) Applicant: Dell Products L.P., Round Rock, TX (US)

(72) Inventors: Chandrasekhar Revuri, Bangalore (IN); Abhishek Gupta, Rohini (IN); Rishi Chandra, Darbhanga (IN); Anand Changegowda, Bangalore (IN); Ravishankar Kanakapura Nanjundaswamy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 480 days.

(21) Appl. No.: 17/384,428

(22) Filed: Jul. 23, 2021

(65) Prior Publication Data

US 2023/0028803 A1 Jan. 26, 2023

(51) Int. Cl.
*G06F 9/50* (2006.01)
*G06F 16/958* (2019.01)

(52) U.S. Cl.
CPC .......... *G06F 9/5044* (2013.01); *G06F 9/5011* (2013.01); *G06F 16/958* (2019.01)

(58) Field of Classification Search
None
See application file for complete search history.

(56) References Cited

U.S. PATENT DOCUMENTS

| | | | | |
|---|---|---|---|---|
| 11,550,383 B2* | 1/2023 | King | ....................... | G06F 1/329 |
| 2018/0025379 A1* | 1/2018 | Hewinson | ............... | H04L 67/53 |
| | | | | 705/14.43 |
| 2020/0412624 A1* | 12/2020 | Brown | ................ | H04L 41/5022 |
| 2022/0317754 A1* | 10/2022 | Li | ......................... | G06F 1/3296 |

OTHER PUBLICATIONS

Hou, Xiaofeng, Chao Li, Jiacheng Liu, Lu Zhang, Yang Hu, and Minyi Guo. "ANT-Man: Towards agile power management in the microservice era." In SC20: International Conference for High Performance Computing, Networking, Storage and Analysis, pp. 1-14. IEEE, 2020. (Year: 2020).*

* cited by examiner

*Primary Examiner* — Frank D Mills
(74) *Attorney, Agent, or Firm* — Jackson Walker L.L.P.

(57) ABSTRACT

A disclosed workload distribution method determines a yield index for each microservice associated with a containerized application executing on a potentially heterogeneous cluster information handling systems. Each microservice is then assigned to one of N priority categories based on its yield index, where three is an acceptable, but not exclusive, value of N. Resource configuration profiles are maintained for each of the priority categories. Each resource configuration profile assigns a resource configuration to each microservice. An information handling resource associated with a particular microservice is configured in accordance with the resource configuration assigned to the particular microservice by a particular resource configuration profile corresponding to the yield index. In this manner, workloads can be assigned and resources configured in accordance with the containerized application's priorities as exposed by the value indices.

14 Claims, 5 Drawing Sheets

METHOD AND SYSTEM FOR BUSINESS YIELD AWARE WORKLOAD DISTRIBUTION

TECHNICAL FIELD

The present disclosure relates to data centers and, more specifically, workload distribution within a data center.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Widely available and easy to use, e-commerce applications are a significant technology tool for businesses and consumers. The yield of an e-commerce application may be measured in terms of the specific operations performed by users of the application. As an example, a yield metric could reflect a ratio of purchasing transactions per hour to browsing transactions per hour. The yield of other types of applications may be measured based on other types of usage parameters. The yield of a multimedia streaming application might indicate the percentage of time users are streaming content in comparison to other functions including, as examples, access functions such as logging on, account and profile functions and preferences, etc.

Many applications are implemented as containerized applications, in which different pieces of functionality are implemented in specifically defined and often narrowly focused microservices. Containerized applications may execute on a heterogeneous cluster of information handling resources including one or more types of processing resources, one more types of storage resources, and so forth, any one of which may be configurable to operate in a desired manner. Configurable parameters often expose a tradeoff between computing performance and energy efficiency. In general, the allocation of cluster resources to application microservices is suboptimal and fails to leverage flexibility inherent in microservice-based computing.

SUMMARY

In accordance with teachings disclosed herein, common problems associated with workload assignments in containerized application environments are addressed by workload distribution methods disclosed herein. Disclosed methods may determine a yield index for each microservice associated with a containerized application executing on a potentially heterogeneous cluster of information handling systems. Each microservice may be assigned to one of N yield categories, also referred to herein as priority categories, based on its yield index.

Resource configuration profiles are maintained for each of the priority categories. Each resource configuration profile assigns one of M resource configurations to each of the application's microservices, where N and M may differ. An information handling resource allocated to a particular instance of a microservice assigned to a particular priority category may be configured in accordance with the resource configuration indicated for the particular microservice by a particular resource configuration profile corresponding to the microservice's particular yield index. In this manner, containerized application workloads can be assigned and resources configured in accordance with the application's priorities as exposed by the yield/priority indices.

Technical advantages of the present disclosure may be readily apparent to one skilled in the art from the figures, description, and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
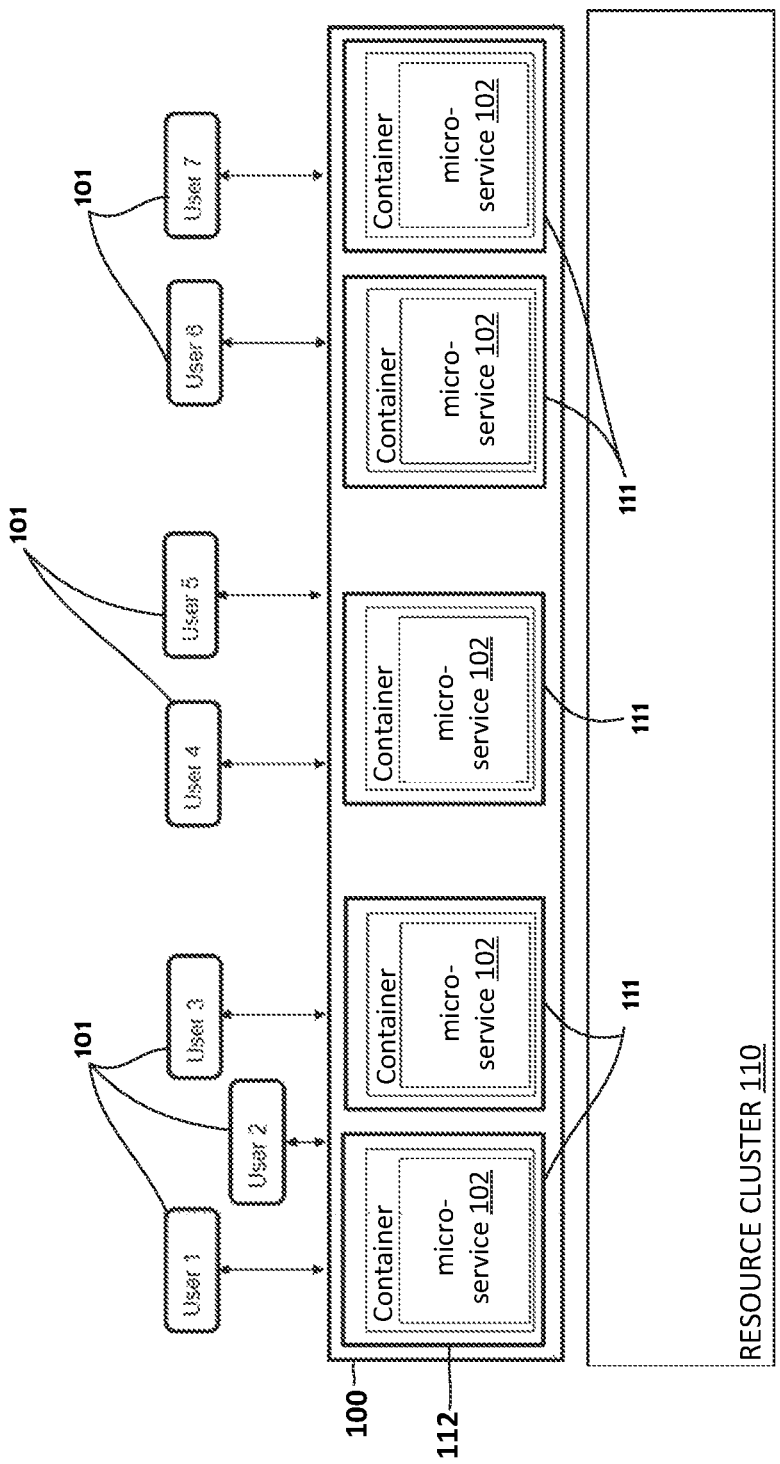
FIG. 1 illustrates a conventional containerized application according to prior art.

Exemplary embodiments and their advantages are best understood by reference to FIGS. 1-[99], wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to the drawings, FIG. 1 illustrates a plurality of users 101 accessing a conventional containerized software application 100 executing on a resource cluster 110. The containerized application 100 illustrated in FIG. 1 includes a plurality of instantiated microservices 102, each of which is illustrated executing within a corresponding container 104 on an information handling resource 111 allocated from resource cluster 110.

The microservices 102 shown in FIG. 1 may include any microservices associated with containerized application 100, including microservices generating or designed to generate a primary objective, informally referred to herein as high yielding microservices, as well as microservices that do not directly contribute to the generation of the primary objective, informally referred to herein as low yielding microservices. In the context of containerized ecommerce applications, as an illustrative example, the instantiated microservices may include microservices that directly result in revenue, such as payment microservices, and microservices that do not directly result in revenue, such as user profile microservices.

The resource cluster 110 may include a heterogeneous collection of information handling systems including different makes and models of compute resources, any one or more of which may be a configurable compute resources. More specifically, some or all of the information handling resources 111 in resource cluster 110 may be configurable to emphasize some combination of compute performance and energy efficiency. Compute performance may be indicated by a performance metric such as instructions per second (IPS), floating point operations per second (FLOPS), etc. Energy efficiency, also referred to herein as power performance, may be indicated by a metric such as average and/or peak power (e.g., watts/hour) or the like.

Despite differences in the perceived or actual yield of different microservices and the potentially achievable power/performance configurations of allocated resources, the conventionally implemented containerized application 100 illustrated in FIG. 1 does not coordinate microservice yield with resource configuration. Instead, resources may be allocated randomly or in accordance with an algorithm or paradigm that is unaware of and/or unconcerned with microservice yield.

Figure 2:
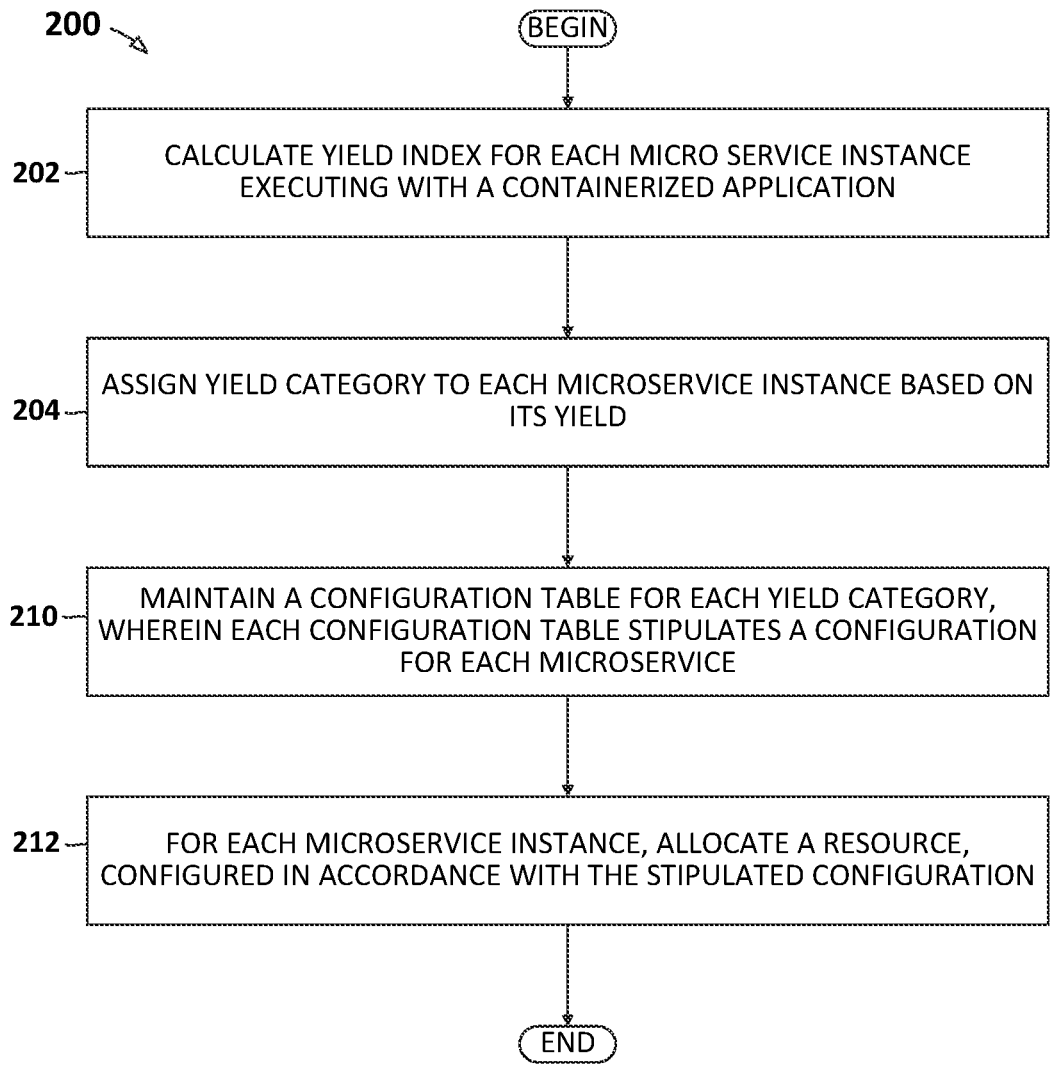
FIG. 2 illustrates a workload distribution method in accordance with disclosed subject matter.

FIG. 2 illustrates a containerized application workload distribution method 200 in accordance with disclosed subject matter. The workload distribution method 200 illustrated in FIG. 2 may be performed by a containerized application 300 illustrated in FIG. 3 and described in more detail below.

The illustrated workload distribution method 200 includes calculating (step 202) a value metric, referred to herein as a yield index or, more simply, a yield, for each microservice instance executing within the containerized application. Each microservice instanced is assigned (step 204) to one of N yield categories based on the microservices yield index where N is an integer greater than 1.

A set of N configuration tables, one for each yield category, is maintained (step 210). Each configuration table may indicate a stipulated or preferred hardware configuration for all or at least some of the microservices associated with the containerized application, including microservices that may not have any current instantiations. For each microservice instance, an information handling resource is allocated (step 212) wherein the resource is configured in accordance with the stipulated configuration.

In this manner, the illustrated method 300 allocates resources configured to emphasize performance where needed, i.e., high yield microservices, and energy efficiency where permitted, i.e., low yield microservices.

Figure 3:
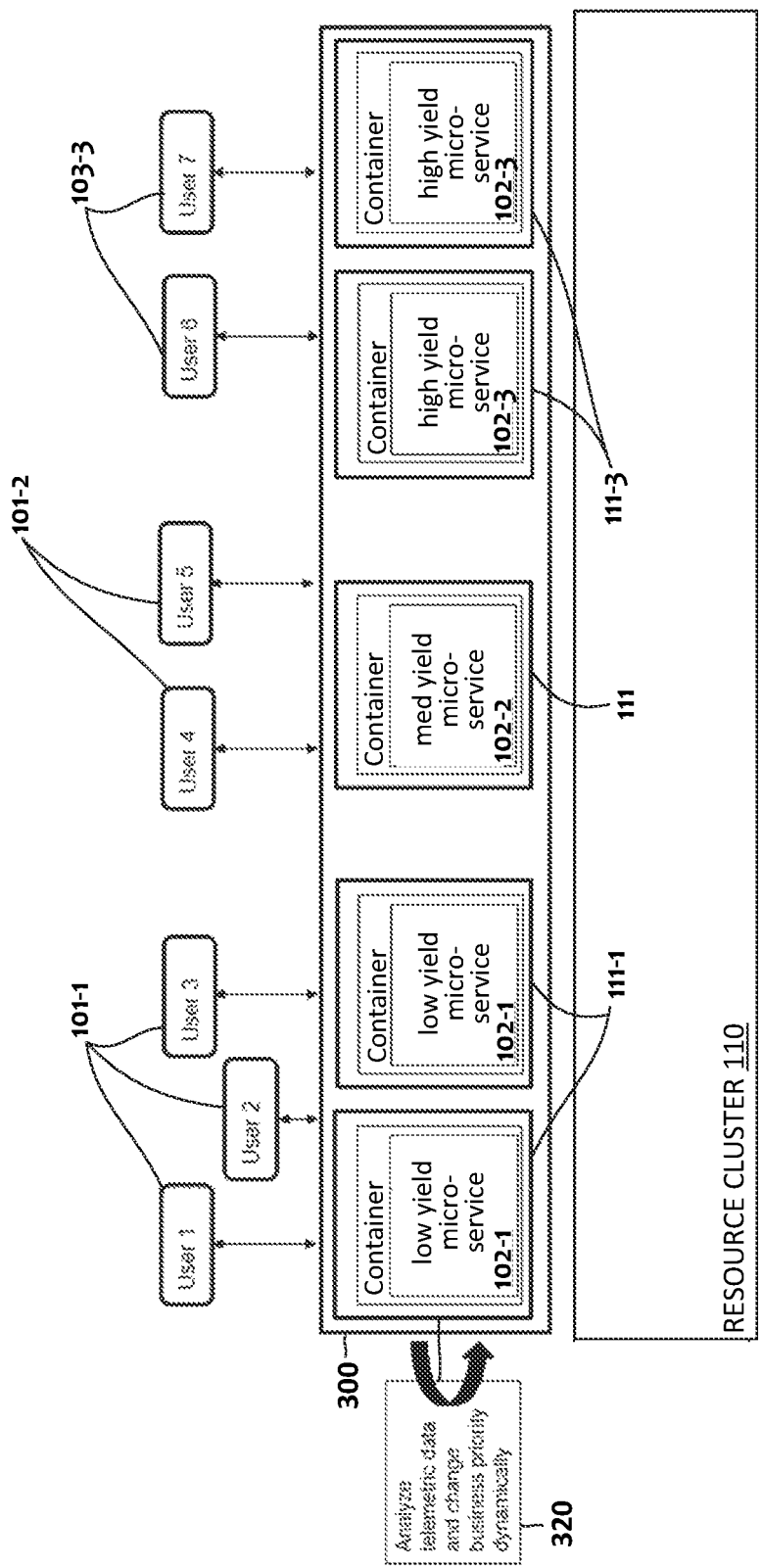
FIG. 3 illustrates a containerized application in accordance with disclosed subject matter.

FIG. 3 illustrates a containerized application 300 in accordance with the workload distribution method 200 of FIG. 2 for an implementation that supports three yield categories and three corresponding resource configuration profiles. For ease of description, the three yield categories and the respective resource configuration profiles are referred to herein as either low, medium, or high. Again however, it will be appreciated by those of ordinary skill that more or fewer yield and profile configuration categories are feasible.

FIG. 3 illustrates three groups of users 101-1, 101-2, and 101-3 actively using containerized application 300, three correspond groups of instantiated microservices, 102-1, 102-2, and 102-3, and three groups of allocated resources 112-1, 112-2, and 112-3. Users 101-1 include users performing low yield microservices 102-1, users 101-2 performing medium yield microservices 102-2, and users 101-3 using high yield microservices 102-3. Also shown in FIG. 3, low yield microservices 102-1 are allocated to resources 111-1 configured in accordance with their low yield configuration profiles (not depicted in FIG. 3), medium yield microservices 102-2 are allocated to resources 111-2 configured in accordance with medium yield configuration profiles (not depicted), and high yield microservices 102-3 are allocated to resources 111-3 configured in accordance with their high yield configuration profiles (not depicted). In this manner, it will be appreciated by those of ordinary skill in the field of containerized application design that the disclosed workload distribution method 200 of FIG. 2 and the exemplary containerized application 300 of FIG. 3 leverages to effectively customize the hardware resources in a microservice-specific way to maximize performance on high yield services and to emphasize energy efficiency on low yield microservices.

In at least some embodiments, the containerized application 300 may be characterized as a commerce application in which revenue is a primary or significant objective, and the yield category assigned to various microservices may be determined by or at least influenced by the amount of revenue attributed to the microservice. By way of illustration, the containerized commerce application may include a microservice for payment services and a different microservice enabling users to browse applicable products. In this example, with all other things being equal, including, for example, the amount of web traffic, the payment microservice may be assigned to a high yield category based on the amount of revenue directly attributable to the microservice whereas the browsing microservice may be characterized as a lower yielding microservice. Continuing with this example, the payment microservice may be assigned to hardware configured in accordance with the hardware's high-yield resource configuration profile. In an analogous manner, the browsing microservice may be characterized as a low yield microservice and may therefore be assigned to resources configured in accordance with their low yield resource configuration profiles. Accordingly, the containerized application is instantiated in a manner that conserves power where appropriate and optimizes performance where most needed.

FIG. 3 further illustrates an analysis module 320 configured to interface with containerized application 300 and, more specifically, configured to monitor the application workload and change the yield category of one or more microservices in accordance with changing activity.

Figure 4:
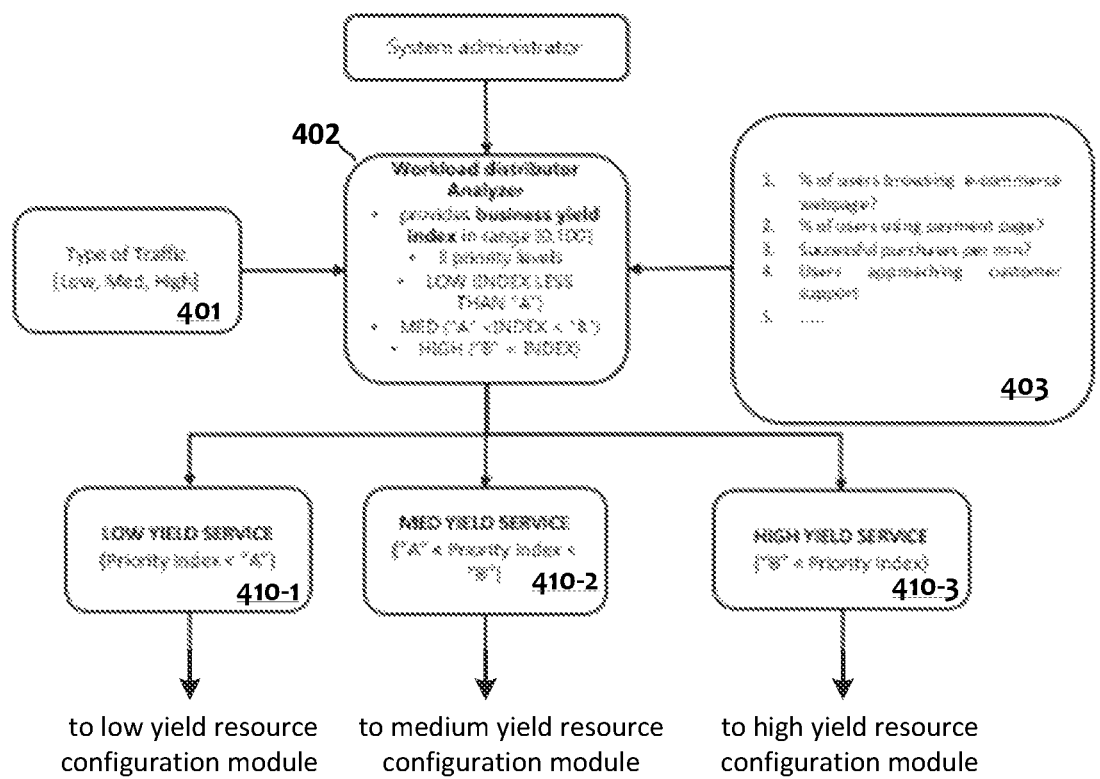
FIG. 4 illustrates a workload analyzer component of the containerized application of FIG. 3.

FIG. 4 illustrates elements of containerized application 300 (FIG. 3) that determine the yield index for each microservice instance executing within the application. As illustrated in FIG. 4, a workload analyzer 401 receives traffic input 402 and quantitative indicators 403 of microservice value. The indicators 403 illustrated in FIG. 4 are representative of a commerce-based containerized application, but those of ordinary skill will appreciate that other parameters may be emphasized in conjunction with non-commerce applications.

The traffic input 402, as suggested by its name, may provide workload analyzer 401 with information regarding the quantity and frequency of user traffic associated with each microservice instance. Traffic input 402 facilitates dynamic determinations of microservice yield. For example, during low volume traffic intervals, workload analyzer 401 may calculate and assign a lower yield index than during high traffic intervals.

In the context of the commerce based containerized application represented in FIG. 4, value indicators that may influence the yield index include, as non-limiting examples, the percentage of users browsing revenue generating webpages, the percentage of users using or accessing a web page for payment, a quantitative indicator of successful transactions per minute, hour, or other another time interval, and a quantitative or qualitative indicator of customer service resource utilization. Those of ordinary skill will recognize the indicators enumerated in the preceding discussion are examples. Other implementations of containerized applications may include more, fewer, and/or different indicators.

The illustrated workload analyzer 401 supports a three category implementation in which the instantiated microservices are categorized into one of three yield categories based upon the applicable yield index. As such, FIG. 4 illustrates workload analyzer 401 assigning microservices to one of three priority categories 410 based upon a yield index determined for each micro service and a pair of threshold values "A" and "B". Microservices with a low yield, i.e., a yield index less than "A" are assigned to the low yield microservice category 410-1. Microservices whose yield index is greater than "A" but less than "B" are assigned to medium yield category 410-2 and micro services with high yields are assigned to the high yielding category 410-3.

Figure 5:
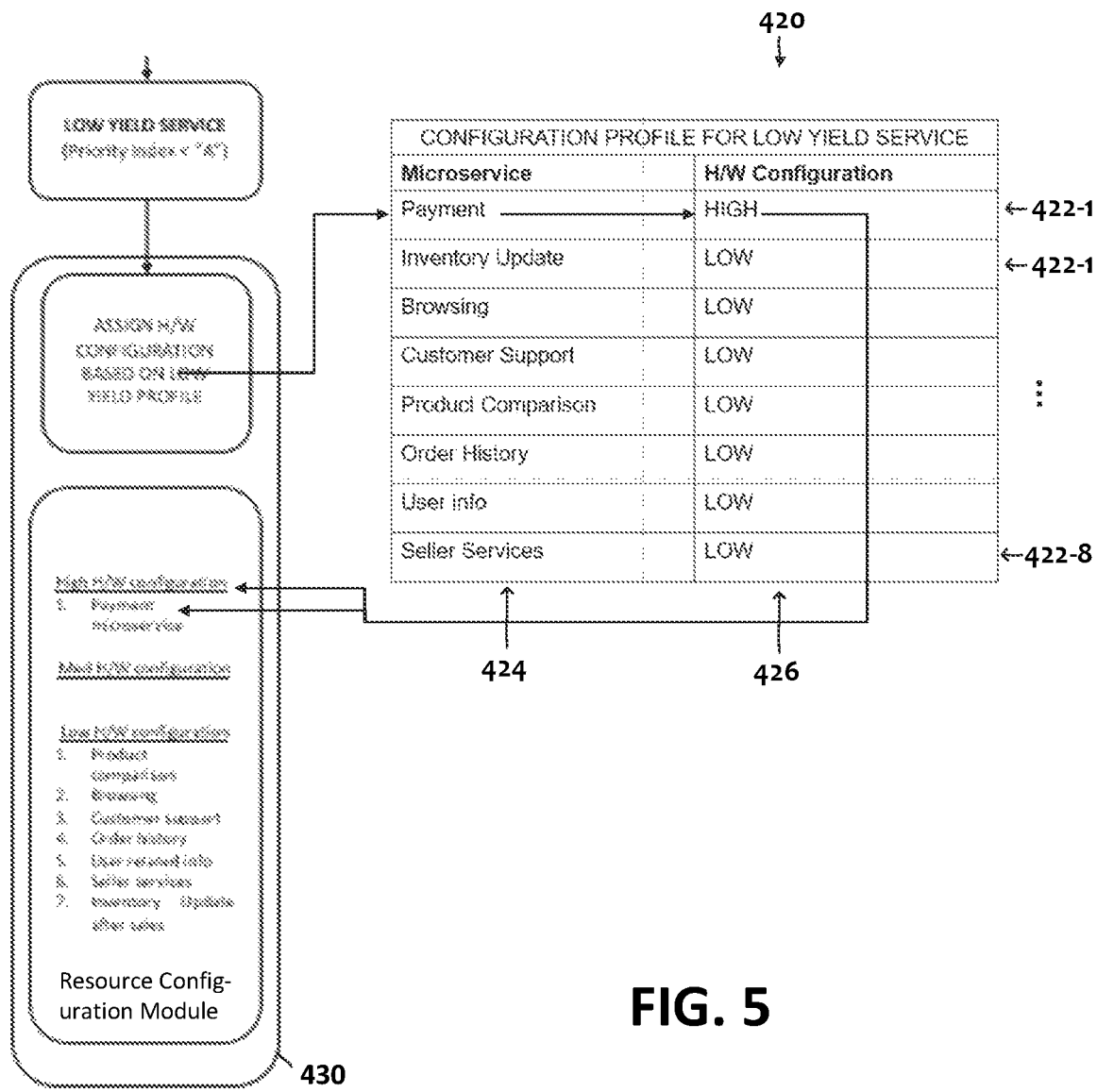
FIG. 5 illustrates an exemplary resource configuration profile and a resource configuration module.

FIG. 5 illustrates elements of containerized application 300 emphasizing the configuration of resource cluster information handling resources in accordance with the perceived value, i.e., the yield, of each instantiated microservice. FIG. 5 illustrates elements specific to low yielding microservices, but it will be readily appreciated that analogous elements for medium yielding and high yielding microservices would be included in the containerized application 300. FIG. 5 illustrates a resource configuration module 430 configured to receive the microservice priority category a signed by work load analyzer 401.

FIG. 5 further illustrates an exemplary configuration table 420 corresponding to low yielding microservices. The resource configuration profile table 420 illustrated in FIG. 5 includes a row or entry 422 for each microservice associated with the containerized application. The illustrated containerized application 300 employees a total of eight microservices and, accordingly, the resource configuration profile 420 illustrated in FIG. 5 includes eight entries 422-1 through 422-8. Each entry 422 in the resource configuration profile 420 includes a microservice field 424 and a hardware configuration field 426. The value stored in the hardware configuration field of a particular resource configuration profile entry 422 indicates the stipulated or preferred hardware configuration for the microservice identified in field 424. FIG. 4 illustrates an example in which a payment microservice has been categorized as a low yield microservice by the work load analyzer 401. The payment service entry 422-1 in the low yield configuration profile 420 illustrated in FIG. 5 stipulates a high performance configuration for resources allocated to the microservice. Accordingly, resource configuration module 430 configures a resource accordingly or allocates the microservice to a resource already configured as a high performance configuration.

Throughout this disclosure, a hyphenated form of a reference numeral refers to a specific instance of an element and the un-hyphenated form of the reference numeral refers to the element generically. Thus, for example, "device 12-1"

refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 [spec text]

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method, comprising:
   determining a yield index for each microservice of a containerized application;
   assigning each microservice into one of N priority categories based on its yield index;
   maintaining N resource configuration profiles corresponding to the N priority categories, wherein each resource configuration profile maps each microservice to one of N hardware configurations;
   configuring hardware for a particular resource running a particular microservice in accordance with the hardware configuration to which the particular microservice is mapped by a particular resource configuration profile corresponding to the yield index, wherein:
   said determining a yield index includes determining the yield index based on:
      factors selected from: percentage of users browsing a particular type of web page, percentage of users accessing a payment web page; a rate of transactions successfully completed, a quantitative measure of customer service utilization; and
      a quantitative measure of web traffic associated with a web page or a type of web page
   the N priority categories include a high priority category, a medium priority category, and a low priority category;
   the N resource configuration files categories include a high priority configuration profiled, a medium priority configuration profile, and a low priority configuration profile;
   the N hardware configurations include a high performance configuration, an energy efficient configuration, and an intermediate configuration corresponding to the medium priority; and
   the low priority configuration profile maps one or more of the microservices to the energy efficient configuration and at least one of the microservices to the high performance configuration.

2. The method of claim 1, wherein the at least one of the microservices mapped to the high performance configuration includes a payment microservice.

3. The method of claim 1, further comprising:
   assigning an initial yield index to each microservice;
   monitoring usage for each microservice; and
   dynamically adjusting the yield index for a particular microservice based on the usage.

4. The method of claim 1, wherein the yield index is indicative of a value of a parameter targeted by the containerized application.

5. The method of claim 4, wherein the containerized application is a commerce application and wherein the parameter targeted by the containerized application is revenue.

6. The method of claim 5, wherein the yield index is influenced by a ratio of revenue generating usage to non-revenue generating usage.

7. The method of claim 4, wherein the containerized application is a social media application and wherein the parameter targeted by the containerized application is user views of social media posts.

8. A containerized application, stored on a nontransitory computer readable medium, including a plurality or microservices configured to execute on an information handling resource cluster, wherein the containerized application is configured to perform operations including:
   determining a yield index for each microservice of a containerized application;
   assigning each microservice into one of N priority categories based on its yield index;
   maintaining N resource configuration profiles corresponding to the N priority categories, wherein each resource configuration profile maps each microservice to one of N hardware configurations;
   configuring hardware for a particular resource running a particular microservice in accordance with the hardware configuration to which the particular microservice is mapped by a particular resource configuration profile corresponding to the yield index, wherein:
   said determining a yield index includes determining the yield index based on:
      factors selected from: percentage of users browsing a particular type of web page, percentage of users accessing a payment web page; a rate of transactions successfully completed, a quantitative measure of customer service utilization; and
      a quantitative measure of web traffic associated with a web page or a type of web page
   the N priority categories include a high priority category, a medium priority category, and a low priority category;

the N resource configuration files categories include a high priority configuration profiled, a medium priority configuration profile, and a low priority configuration profile;

the N hardware configurations include a high performance configuration, an energy efficient configuration, and an intermediate configuration corresponding to the medium priority; and the low priority configuration profile maps one or more of the microservices to the energy efficient configuration and at least one of the microservices to the high performance configuration.

9. The containerized application of claim 8, wherein the at least one of the microservices mapped to the high performance configuration includes a payment microservice.

10. The containerized application of claim 8, further comprising:

assigning an initial yield index to each microservice;

monitoring usage for each microservice; and dynamically adjusting the yield index for a particular microservice based on the usage.

11. The containerized application of claim 8, wherein the yield index is indicative of a value of a parameter targeted by the containerized application.

12. The containerized application of claim 11, wherein the containerized application is a commerce application and wherein the parameter targeted by the containerized application is revenue.

13. The containerized application of claim 12, wherein the yield index is influenced by a ratio of revenue generating usage to non-revenue generating usage.

14. The containerized application of claim 12, wherein the containerized application is a social media application and wherein the parameter targeted by the containerized application is user views of social media posts.

* * * * *